United States Patent [19]

Polaert et al.

[11] Patent Number: 4,866,529
[45] Date of Patent: Sep. 12, 1989

[54] OPTICAL RELAY PROVIDING A PROJECTED IMAGE PRESENTING CHARACTERS HAVING AN ENHANCED READABILITY

[75] Inventors: Rémy Polaert, Villecresnes; Maurice Tissot, Paris, both of France

[73] Assignee: U.S. Philips Corporation, New York, N.Y.

[21] Appl. No.: 20,924

[22] Filed: Mar. 2, 1987

[30] Foreign Application Priority Data

Mar. 4, 1986 [FR] France .............................. 86 02992

[51] Int. Cl.⁴ .................. G02F 1/03; G09G 3/02; H04N 5/74
[52] U.S. Cl. ............................. 358/232; 340/713; 350/393
[58] Field of Search .............. 358/232; 340/713, 714, 340/794; 350/393

[56] References Cited

U.S. PATENT DOCUMENTS

| 2,983,824 | 5/1961 | Weeks et al. | 358/232 X |
| 3,520,589 | 7/1970 | Angel et al. | 358/232 X |
| 3,637,931 | 1/1972 | Donjon et al. | 358/232 |
| 3,878,328 | 4/1975 | Marie et al. | 358/232 |
| 4,692,758 | 9/1987 | Fawcett et al. | 340/735 |

FOREIGN PATENT DOCUMENTS

| 1473212 | 3/1967 | France | 358/232 |
| 1479284 | 5/1967 | France | 358/232 |
| 2386222 | 12/1978 | France | 358/232 |
| 441505 | 1/1936 | United Kingdom | 358/232 |

Primary Examiner—Bruce Y. Arnold
Assistant Examiner—David J. Edmondson
Attorney, Agent, or Firm—Michael E. Marion

[57] ABSTRACT

The invention relates to an optical relay which includes a target plate of an electrically insulating material and allowing the light to pass in a manner dependent on the electric field parallel to the direction of propagation of this light, means for scanning a first surface of this target plate by means of an electronic beam (34) controlled by a wehnelt electrode (34), an anode (38), an optically transparent plate (38) which is electrically conductive and which receives the visual information electric signal from an amplifier which supplies a video signal. The optical relay operates with a further amplifier (52) which applies a small overmodulation supplied by the video signal to the wehnelt electrode in order to enhance the readability. The overmodulation may be automatically controlled by means of a picture integrator.

2 Claims, 2 Drawing Sheets

OPTICAL RELAY PROVIDING A PROJECTED IMAGE PRESENTING CHARACTERS HAVING AN ENHANCED READABILITY

BACKGROUND OF THE INVENTION

The invention relates to an optical relay comprising a target plate of an electrically insulating material and allowing light to pass in a manner dependent on an electric field parallel to the direction of propagation of said light, means for scanning a first surface of said target plate by means of an electronic beam controlled by a wehnelt electrode, an anode suitable for collecting secondary electrons emitted by the action of said beam, an optically transparent and electrically conducting thin plate engaging a second surface of the target plate, said thin plate receiving the visual information electric signal from an amplifier which supplies a video signal realising a potential modulation of the target plate which is constituted by a material becoming ferroelectric below a given temperature referred to as the Curie temperature in the proximity of which the optical relay is operative.

An optical relay of this type for projection television is described in French Pat. Nos. 1,473,212 (U.S. Pat. No. 3,520,589) and 1,479,284. For a better understanding of the invention the operating principle of this optical relay will be described hereinafter. More extensive information can be obtained from the above-cited documents.

Within the scope of the invention an electric signal having a temporal variation and representing visual information is transformed into a visible image. It is known that this is one of the roles of a television receiver.

In the image tube of such a receiver the electron beam fulfills the three fundamental functions of this transformation:

f1-it supplies the energy which should appear in a luminous form: the luminous power of the tube is thus always less than the power transferred by the beam;

f2-it realises the spatial scanning of the image surface;

f3-it supplies the visual information.

Because of the functions f2 and f3, inter alia, the power of the beam and thus the brightness of the image cannot be improved as much as would be necessary for projection on, for example a large screen.

This is why it has been proposed to separate the function f1 of, for example an arc lamp, from the functions f2 and f3 of what is referred to as an "optical relay". In this proposal a crystal is used having an electro-optical effect referred to as the "Pockel's effect". A double-acid potassium phosphate crystal $KH_2PO_4$ hereinafter referred to as KDP is suitable for this purpose.

This effect may be broadly described as follows: when the electrically insulating crystal is exposed to an electric field parallel to its crystal axis c (the three crystal axes a, b and c are mutually orthogonal, with the axis c being the optic axis in this case), the refractive index n of this crystal for light rays propagating in the c direction with linear polarization in the ab plane depends on the direction of polarisation. If X and Y designate the bisectrices of the axes a and b and if the parameters of the crystal with respect to these different directions are designated by the letters used for said directions, it can be said that the diagram of the refractive indices in the ab plane forms an ellipse having axes X and Y instead of forming a circle, and that the difference between said indices $n_x - n_y$ is proportional to the electric field applied. It follows therefrom that if the incident light rays are polarized parallel to the axis a, for example, the intensity I of the light passing through an output polariser is $I = I_o \sin^2 kV$ if the direction of polarization of this polarizer is parallel to the axis b, and $I = I_o \cos^2 kV$ if this direction is parallel to the axis a, $I_o$ is the intensity of the incident light when no parasitic absorption occurs, V is the electric potential difference between the two planes of the crystal, and k is a coefficient depending upon the crystal material used.

In order to obtain a projected picture by means of a lamp via this device, it is sufficient, as stated above, to apply an electric field parallel to the axis c and to cause the value of this field at any point of the target plate to correspond to the brightness at the corresponding point of the picture to be obtained. For this purpose an electron beam emitted by an electron gun and traversing conventional deflection members scans the target plate and thus performs the function f2. The function f3, that is to say, the control of the electric field, is also performed by the beam in the following manner.

When the electrons of the beam arrive at the surface of the target plate, they cause secondary electrons if their energy lies within the desired limits and if the anode potential is sufficiently high, the number of secondary electrons exceeding that of the incident electrons. As a result the electric potential of the point of incidence is raised so that the potential difference between the anode and this point is reduced. If the electrons of the beam strike this point in a sufficient number, this potential difference becomes negative and reaches such a value (for example −3V) that each incident electron releases only a single secondary electron. The potential of this point thus reaches a limit value with respect to the anode potential. In accordance with the scanning rate the intensity of the beam is to be sufficiently high. If the anode potential is constant, each passage of the electron beam fixes, as stated above, the potential of any point A of the surface at a value $V_o$ independently of this point and at the instant of passage. However, the corresponding electric charge at this point depends on the potential of the control electrode arranged in the proximity of the other side of the target plate.

If VA is the potential of this electrode at the instant of passage, this charge is proportional to $V_o - VA$, in which VA represents the value of the visual information signal at the instant of its passage.

The target plate whose birefringence depends on the electric field is formed by a single crystal of KDP in which about 95% of the hydrogen is in the form of heavy hydrogen (deuterium).

With a given thickness of the crystal the Pockel's effect is proportional to the charges produced on the crystal sides and hence, with a given control voltage, to the dielectric constant of the crystal. This is why a target plate is used which is formed by a crystal becoming ferro-electric below a given temperature referred to as the Curie temperature and why operation is advantageous in the proximity of this temperature, because the dielectric constant then attains very high values and the optical relay can function by means of readily obtainable control voltages (the Pockel's effect is proportional to the product $\epsilon V$).

The most frequently used crystals exhibiting this phenomenon are acid salts of the KDP type in the quadratic crystal class the optic axis of which is parallel to the crystal axis c. Its Curie temperature is about $-53°$ C. Above this Curie temperature the DKDP is a quadratic crystal in the symmetry class 42 m and it has a para-electric behavior. Below the Curie temperature the DKDP becomes orthorhombic, symmetry class mm2, and exhibits a ferroelectric behavior: locally there is spontaneous polarization and appearance of ferroelectric domains.

At the ambient temperature the crystal is anisotropic, but in the proximity of the Curie temperature the anisotropy becomes extremely important. The change of state is accompanied by abrupt variations in the physical properties along the axes of the crystal:

piezo-electric coefficients,
electro-optical coefficients,
dielectric constants $\epsilon_x$ and $\epsilon_z$.

Thus the dielectric constant $\epsilon_z$ goes from a value of approximately $a$ at the ambient temperature to a value of 30,000 at the Curie temperature.

It is known that from an electrical point of view the apparent thickness e of the DKDP crystal is $$e = E.(\epsilon_x/\epsilon'_z)^{0.5}$$

The target plate appears to be thinner as the ratio $\epsilon_x/\epsilon'_z$ is smaller, where $\epsilon'_z$ has the value of $\epsilon_z$ when the crystal is blocked mechanically. In an optical relay the monocrystalline DKDP plate having a thickness E of approximately 250 microns is firmly adhered to a rigid support: a fluorine plate having a thickness of 5 mm.

The optical relay target plate is thus generally cooled to $-51°$ C., that is to say to a temperature which is slightly higher than the Curie temperature. In these conditions $\epsilon_x/\epsilon'_z = 1/9$ and the apparent thickness of the crystal is approximately 80 microns, which gives the optical relay a satisfactory picture resolution. Below the Curie temperature this ratio $\epsilon_x/\epsilon'_z$ is still smaller, which results in a much better picture resolution.

When such an optical relay is used for projecting information such as marks and/or alphanumeric characters, their visibility is greatly dependent on the scanning format. This becomes manifest when the scanning standard is changed from 625 lines to 1025 lines. The increase in the number of horizontal scanning lines is then accompanied by a considerable attenuation of the contrast in the horizontal marks, which impedes the readability of the projected alphanumeric characters.

This attenuation in the contrast of the horizontal marks as a function of narrowing the scanning lines also becomes manifest in the case of white marks on a black background or black marks on a white background.

If the horizontal scanning is compressed, it is the vertical marks which become less visible, whereas the vertical marks become much larger and much more luminous if this horizontal scanning is dilated.

The same inconveniences likewise appear, though to a lesser degree, in the case of television pictures.

SUMMARY OF THE INVENTION

It is the object of the invention to improve the readability, specifically for information such as marks and/or alphanumeric characters.

To this end the invention as described in the opening paragraph is characterized in that the optical relay comprises a further amplifier which applies a small overmodulation signal supplied by the video signal to the wehnelt electrode of the optical relay, and in connection with the average brightness level of the image produced by the modulation of the potential of the target plate the polarity and the amplitude of this overmodulation signal is controlled in order to produce an improvement which is proportional to the brightness level or darkness level of bright or dark characters, respectively.

This small overmodulation signal applied to the wehnelt electrode produces a modulation of the beam current which adds to the usual modulation, which is applied to the target plate and which constitutes the usual operating mode for stabilizing the potential at a constant electronic current. For a white character the alteration produced by the overmodulation consists in increasing the beam current for all the white parts of the picture. The overmodulation signal thereby equalizes the brightness of the horizontal and vertical parts of the characters and enhances their visibility. But the amount of overmodulation of the beam current should remain small to prevent an excess inscription of white with respect to black.

For realizing this overmodulation of the beam current an amplifier is used which applies to the wehnelt electrode of the optical relay an overmodulation in a small amount from the same video signal as the one which is applied to the target plate. With a modulation of the target plate at, for example below $-80$ Volt the stabilized beam current corresponding thereto is 10 micro-amperes. If it is desired to have white characters on a black background an overmodulation of $+6$ Volt is superimposed on the wehnelt electrode and the current changes to a value of 10.8 micro-amperes. This variation is sufficiently small in order not to disturb the beam focussing.

In the opposite case in which black characters are desired on a white background, the beam current must be reduced for the white and must be increased for the black. The overmodulation polarity is inversed for this purpose and is $-6$ Volt with a modulation of the target plate at $-80$ Volt.

This overmodulation is thus dependent on the picture content. If this content is modified to a very small extent as far as luminosity is concerned, for example with a regular display of alphanumeric characters, the overmodulation may be controlled by the user as required. But if this content is very much variable and produces great variations in the brightness of the picture, this overmodulation control may be effected automatically with the aid of a picture integrator, which determines the average brightness level of the picture. This integrator controls the polarity and the rate of overmodulation to be applied to the wehnelt electrode by means of the amplifier.

BRIEF DESCRIPTION OF THE DRAWINGS

The invention will now be described in greater detail with reference to the accompanying drawings in which.

DETAILED DESCRIPTION OF THE INVENTION

Figure 1:
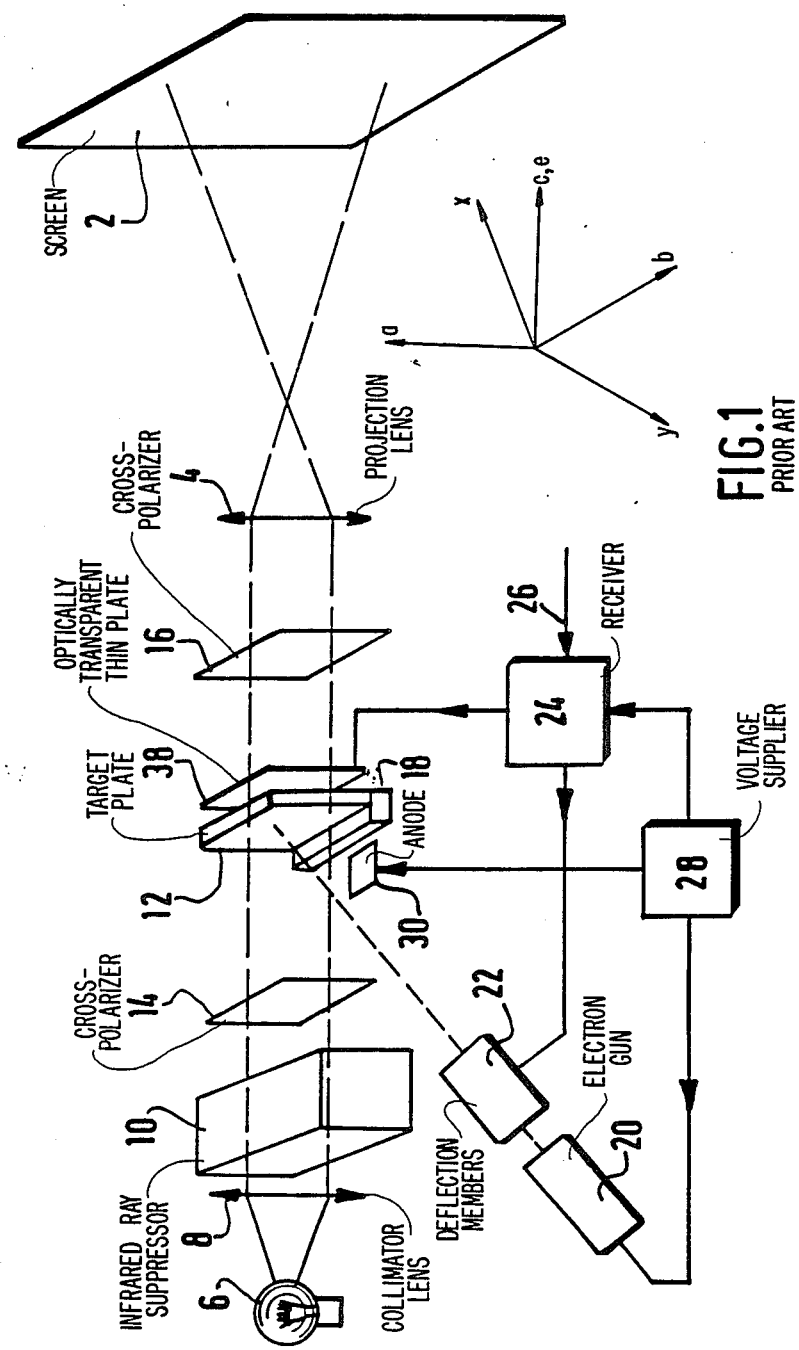
FIG. 1 is a sectional view of the basic part of the optical relay in accordance with the prior art

FIG. 1 shows diagrammatically the essential elements of an optical relay and the elements co-operating with this relay for obtaining a visible picture projected on a screen 2 through a projection lens 4. The light is supplied by a lamp 6 shown as an incandescent lamp, although other types of lamps may be employed. This light passes through a collimator lens 8, then through means 10 serving for suppressing infrared rays, or infrared ray suppressor. The optical relay is formed essentially by a target plate 12 consisting of a parallelopiped-shaped single crystal of KDP whose optic axis (c) is at right angles to the major sides and which is arranged between two crossed polarizers 14 and 16 the planes of polarization of which are parallel to the two further crystal axes (a and b) of the single crystal. A heat exchanger 18 is connected to the target plate 12 which is held approximately at its Curie temperature. An electron beam is directed to the left-hand side of this target plate; this beam is indicated by a broken line and is produced by an electron gun 20. This beam scans periodically the whole useful surface of the target plate 12 by means of deflection members 22 which are controlled by the scanning signals from a receiver 24 processing the signals on the basis of synchronising signals applied to its input 26 together with the actual video information. A unit 28 or voltage supplier supplies the required direct voltages for some of said elements and for an anode 30. For the sake of clarity this anode is represented by a plate parallel to the light beam; this arrangement of course allows free passage of light but is not so effective for the collection of secondary electrons emitted by all points of the surface of the target plate 12 struck by the electron beam. In practice the anode is therefore arranged parallel to the surface of the target plate 12 in close vicinity thereof. Since the incident electron beam and the light beam have to pass the anode, the latter is constructed, for example in the form of a grid. An electrically conductive and optically transparent thin plate 38 which is formed by a thin layer of, for example gold is arranged behind the target plate 12. The video information signal is applied to this plate 38 by the receiver 24.

Figure 2:
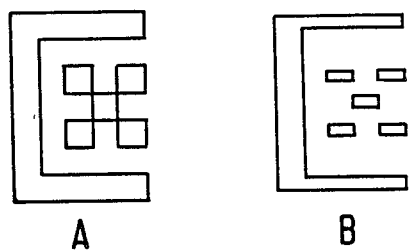
FIG. 2 shows a character to be reproduced in A and a character to be reproduced with an error in B.

FIG. 2 shows at A a character to be reproduced which is formed from horizontal parts and vertical parts representing the letter C around five squares which are in contact with each other by means of apexes. When a picture is projected by means of a prior art optical relay, it produces inaccuracies of such a character. Particularly with a higher number of scanning lines, for example 1025 lines, the horizontal parts are thinner and the squares are thus not joined together. The drawing B incorrectly reproduces these deformations because it also produces a loss of definition of the character which may render the character unreadable.

For a quantitative calculation of this phenomenon it may be supposed that the visibility of a white mark is the product of its amplitude peak P and its half width L. The relative visibility of a horizontal mark with respect to that of a vertical mark may be expressed by the ratio:

$$R = \frac{P_h \cdot L_h}{P_v \cdot L_v}$$

Ideally, this ratio should be equal to 1.

Measures which have been taken in accordance with the usual operation have shown that the brightness of the horizontal marks is only 0.41 times that of the vertical marks. This deterioration of the readability of the characters is a function of the states of contraction and expansion of the scanning field and/or lines to be utilized.

In order to give this relative visibility coefficient a value close to the theoretical value of 1, a small overmodulation signal is applied to the wehnelt electrode according to the invention. At a target plate voltage of −80 Volt and an overmodulation of +6 Volt which results in an increase of the beam current from 10 to 10.8 micro-amperes, a relative visibility coefficient of 1.1 is obtained. The characters thus treated correspond to the white characters on a black background. Such an overmodulation thus enhances the white level. If it is desired to have black characters on a white background, the white level must thus be reduced and an overmodulation having a polarity which is inverse to the aforementioned polarity, i.e. −6 Volt in the example, should be applied.

Figure 3:
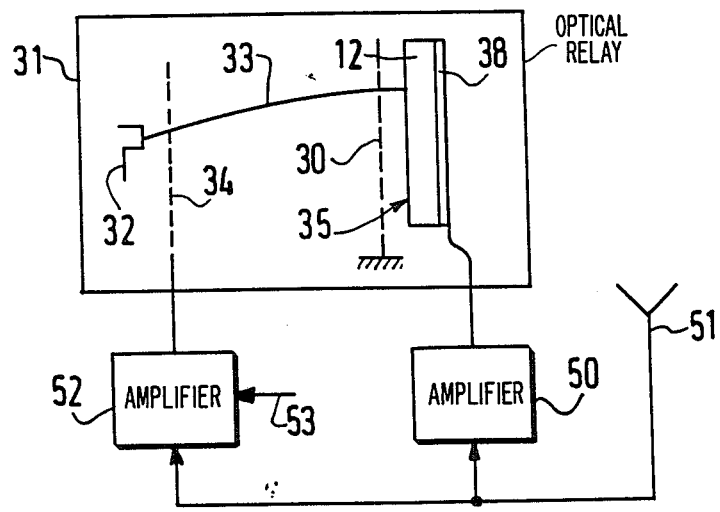
FIG. 3 is a diagrammatic representation of the optical relay with an amplifier applying an overmodulation to the wehnelt electrode.

FIG. 3 shows diagrammatically an optical relay 31 likewise as that shown in FIG. 1. It comprises a cathode 32 emitting an electron beam 33 which traverses a wehnelt electrode 34 and strikes the target plate 12. The thin plate 38, which receives the video signal from an amplifier 50, modulates the charge of the front side 35 of the target plate 12 which is provided by the electron beam 33 at the initial constant current. The anode grid 30 connected to ground controls the potential of this front side 35 so that this initial modulation is effected at a stabilised potential. The video signal from a video source symbolically shown in the embodiment by means of an antenna 51 is introduced in the amplifier 50. The invention uses a second amplifier 52 which is also connected to the same video source and which applies a small overmodulation to the wehnelt electrode 34. This electrode slightly modulates the initially constant beam current and thus modifies the potential of the front side 35 of the target plate 12.

In accordance with the nature of the characters to be reproduced, for example black characters (dark) on a white background (bright) or conversely, the depth and polarity of overmodulation should be adjusted. By means of a control 53 the user can thus effect thus control with respect to the average brightness level of the picture.

However, the variations in brightness of the picture necessitate a very rapid control.

Figure 4:
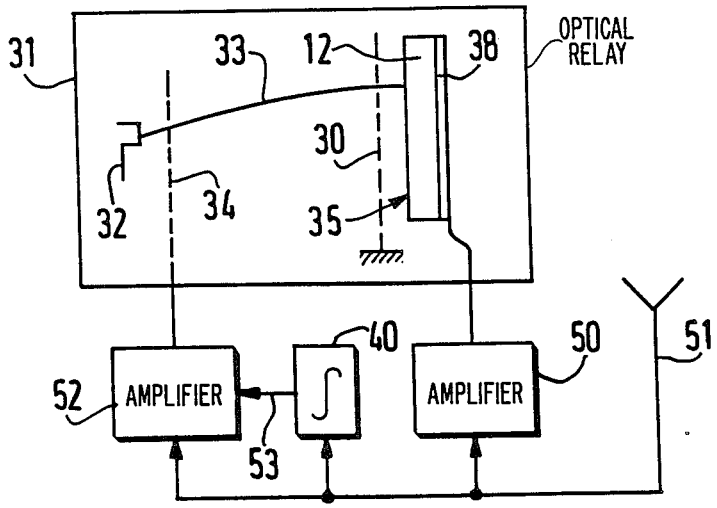
FIG. 4 is a diagrammatic representation identical to that of FIG. 3 with a picture integrator controlling the overmodulation amplifier.

For this purpose the invention uses a picture integrator 40 shown in FIG. 4, which is connected to the video source and integrates the luminous content of the picture to one or several fields or in a particular zone of the picture and automatically effects the control of the depth and the polarity of the overmodulation signal with respect to the average brightness level of the picture.

We claim:

1. An optical relay having an input which provides an image from a video signal presented at said input, said optical relay comprising:

(a) a target plate having first and second surfaces;

(b) means for scanning said first surface of said target plate;

(c) a first amplifier means coupled to said input, for providing a visual information signal from said video signal;

(d) means coupled to said first amplifier means for modulating the potential of said target plate in response to said visual information signal so as to produce said image; and (e) a second amplifier means coupled to said first amplifier means, for providing an overmodulation signal to said scanning means, the polarity and amplitude of said overmodulation signal being controlled in connection with the average brightness level of said image in order to produce an improvement in said image which is proportional to said brightness level.

2. The optical relay of claim 1 wherein said modulating means comprises a thin plate coupled to said second surface of said target plate.

* * * * *